(12) United States Patent
Huang

(10) Patent No.: US 11,776,249 B2
(45) Date of Patent: Oct. 3, 2023

(54) METHOD FOR IDENTIFYING NON-INSPECTABLE OBJECTS IN PACKAGING, AND APPARATUS AND STORAGE MEDIUM APPLYING METHOD

(71) Applicant: HON HAI PRECISION INDUSTRY CO., LTD., New Taipei (TW)

(72) Inventor: Ying-Tien Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 226 days.

(21) Appl. No.: 17/516,840

(22) Filed: Nov. 2, 2021

(65) Prior Publication Data

US 2022/0138463 A1 May 5, 2022

(30) Foreign Application Priority Data

Nov. 2, 2020 (CN) .......................... 202011205207.4

(51) Int. Cl.
*G06V 10/22* (2022.01)
*G06V 10/50* (2022.01)
*G06V 20/00* (2022.01)

(52) U.S. Cl.
CPC .............. *G06V 20/00* (2022.01); *G06V 10/22* (2022.01); *G06V 10/50* (2022.01)

(58) Field of Classification Search
None
See application file for complete search history.

(56) References Cited

U.S. PATENT DOCUMENTS

2014/0139633 A1 5/2014 Wang et al.
2020/0389624 A1* 12/2020 Oberholzer .............. H04N 7/18

FOREIGN PATENT DOCUMENTS

CN 105122270 A 12/2015
CN 107946221 A 4/2018

* cited by examiner

*Primary Examiner* — Idowu O Osifade
(74) *Attorney, Agent, or Firm* — ScienBiziP, P.C.

(57) ABSTRACT

A method for identifying individual objects and their number and respective locations in a sealed case creates a detection model by using standard data as a training set. Image of the sealed case is captured and divided into a specified number of detection regions. Images of first detection regions in the detection image as taken as local images and input into the detection model. The numbers and locations of target objects in the sealed case is obtained based on a statistic result outputted by the detection model. The standard data includes sample images of the sealed case with different numbers and respective locations of the target objects in the case. A capacity of the sealed case is M, and a number of the sample image is less than $2^M$. A target identification apparatus and a storage medium applying the method are also disclosed.

20 Claims, 6 Drawing Sheets

METHOD FOR IDENTIFYING NON-INSPECTABLE OBJECTS IN PACKAGING, AND APPARATUS AND STORAGE MEDIUM APPLYING METHOD

FIELD

The subject matter herein generally relates to object identification.

BACKGROUND

Objects, such as wafers or other semiconductor structures, are received in sealed package during transportation, for avoiding being polluted and for electrical isolation. A number of objects and their positions might be recognized by visual inspection from different angles. Due to the denseness of the packaging and of the objects themselves, visual inspections can lead to erroneous identifications.

Thus, there is room for improvement in the art.

BRIEF DESCRIPTION OF THE FIGURES

Implementations of the present disclosure will now be described, by way of example only, with reference to the attached figures.

DETAILED DESCRIPTION

Figure 1:
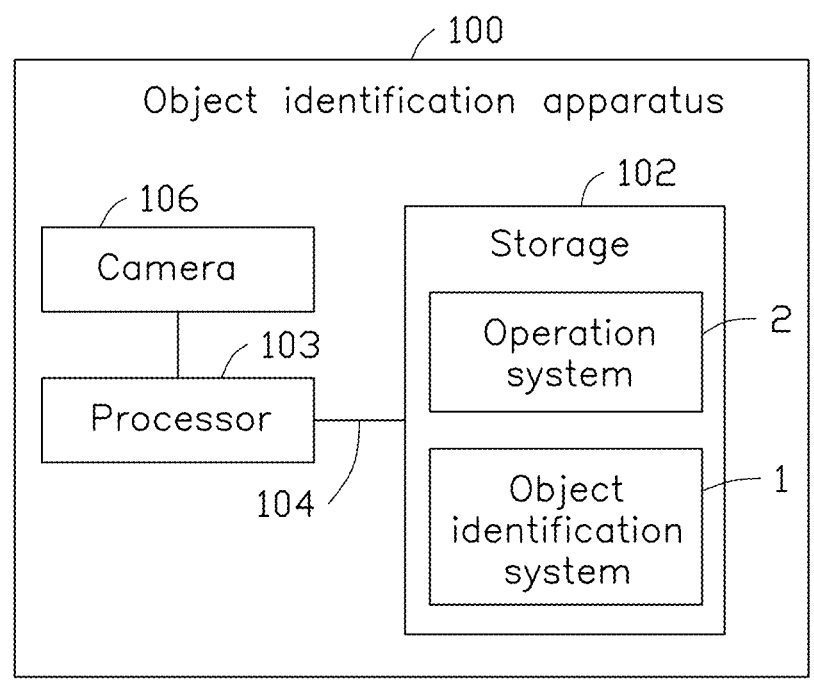
FIG. 1 is a diagram illustrating an embodiment of an object identification apparatus applying an object location system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

In general, the word "module," as used herein, refers to logic embodied in hardware or firmware, or to a collection of software instructions, written in a programming language, for example, Java, C, or assembly. One or more software instructions in the modules may be embedded in firmware, such as an EPROM, magnetic, or optical drives. It will be appreciated that modules may comprise connected logic units, such as gates and flip-flops, and may comprise programmable units, such as programmable gate arrays or processors, such as a CPU. The modules described herein may be implemented as either software and/or hardware modules and may be stored in any type of computer-readable medium or other computer storage systems. The term "comprising" means "including, but not necessarily limited to"; it specifically indicates open-ended inclusion or membership in a so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

The present disclosure provides an object identification apparatus, identification system, and method for identification.

FIG. 1 shows an object identification apparatus 100. The object identification apparatus 100 captures an image of target objects 201 received in sealed packaging (sealed case 200), inputs the captured image into a detection model, and identifies number and locations of individual target objects 201 in the sealed case 200. In one embodiment, the sealed case 200 is a box for shipping wafers. The sealed case 200 can be made of transparent material or semi-transparent material. The target objects 201 are wafers.

The object identification apparatus 100 includes a storage 102, a processor 103, a data bus 104, and a camera 106.

The storage 102 stores program codes. The storage 102 can be an embedded circuit having a storing function, such as a memory card, a trans-flash (TF) card, a smart media card, a secure digital card, and a flash card, and so on. The storage 102 transmits and receives data to and from the processor 103 through the data bus 104. The storage 102 stores an object identification system 1 and an operation system 2.

The operation system 2 manages and controls hardware and software programs. The operation system 2 further supports operations of the object identification system 1 and other software and programs.

Figure 2:
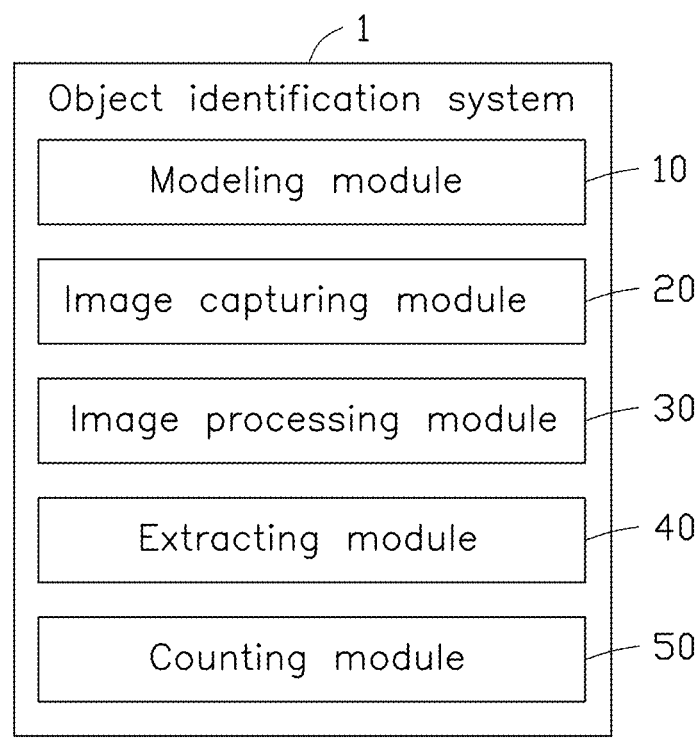
FIG. 2 is a diagram illustrating an embodiment of the object identification system of FIG. 1.

The processor 103 can be a micro-processor or a digital processor. The processor 103 is used for running the program codes stored in the storage 102 to execute different functions. Modules in FIG. 2 are program codes stored in the storage 102 and are implemented by the processor 103 for executing a method for locating target objects 201 in the sealed case 200. The processor 103 can be a central processing unit (CPU), or a large scale integrated circuit, being an operating core and a control core.

The data bus 104 transmits data with the storage 102 and the processor 103.

The camera 106 can capture images of the sealed case 200 to form sample images and detection images.

FIG. 2 shows the object identification system 1. The object identification system 1 includes a plurality of modules.

A modeling module 10 models a detection model by using standard data as a training set.

Figure 4:
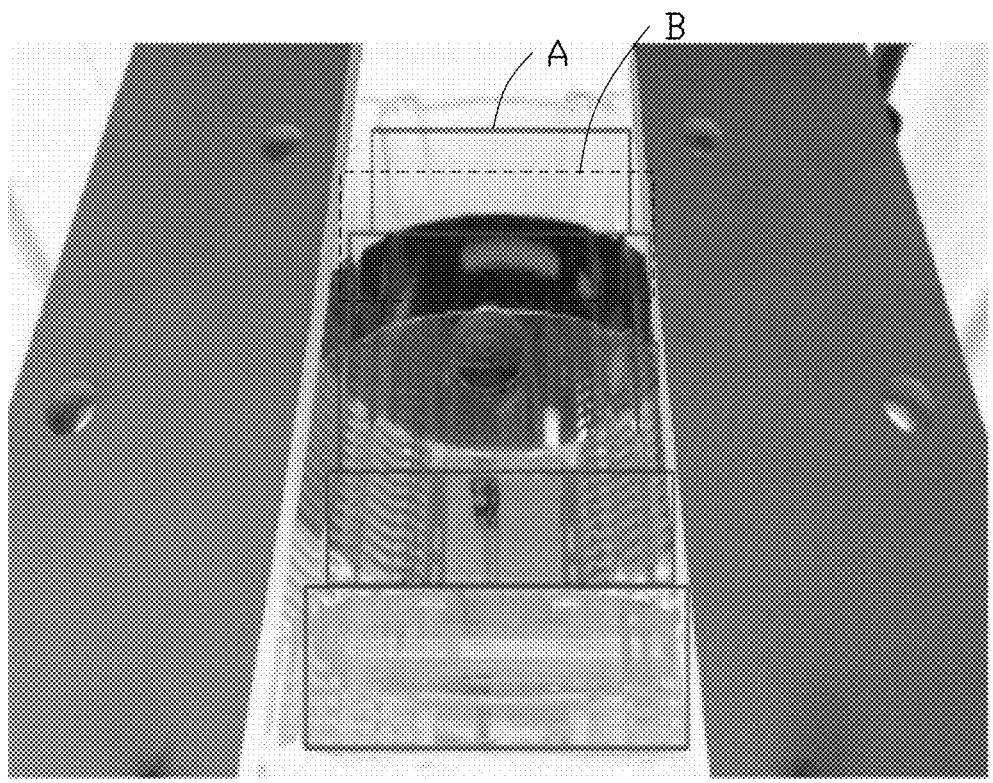
FIG. 4 is a diagram illustrating an embodiment of an image captured by the camera of FIG. 3.

In one embodiment, the standard data includes a plurality of sample images of the sealed case 200 with the target objects 201, each sample image corresponds to different numbers of items and locations of the target objects 201. The standard data further includes a plurality of supplementary images. The modeling module 10 further divides each image in the standard data into a specified number of first detection regions A (as shown in FIG. 4), selects one of the first detection regions A as a first standard region, and obtains the images of the first standard region with different numbers and locations of the target objects 201 as the sample images. The modeling module 10 further selects one second detection region B as a second standard region and obtains the images of the second standard region with different numbers and locations of the target objects 201 as the supplementary images. The training set of the detection model includes the sample images and the supplementary images. Each supplementary image is used for identifying the target object 201 between two adjacent first standard regions A. The image region is equal to a region of an image captured by the camera 106. The number of the supplementary images is less than or equal to the number of the sample images. A capacity of the sealed case 200, which is a maximum number of the received target objects 201, is M, and a specified number is N, N is less than M. The number of the sample images is $2^{(M/N)}$. When M is 25, the number of the sample images is $2^5=32$, and the number of the supplementary images can be 3. The sample images and the supplementary images can clearly identify locations of the target objects 201. The specified number can be set according to user's requirements. The detection model is a deep learning network model.

In at least one embodiment, each second standard region B is overlapped with two adjacent first standard regions A. A size of the second standard region B is equal to a size of the first standard region A.

An image capturing module 20 captures an image of the sealed case 200 by the camera 106 as a detection image.

Figure 3:
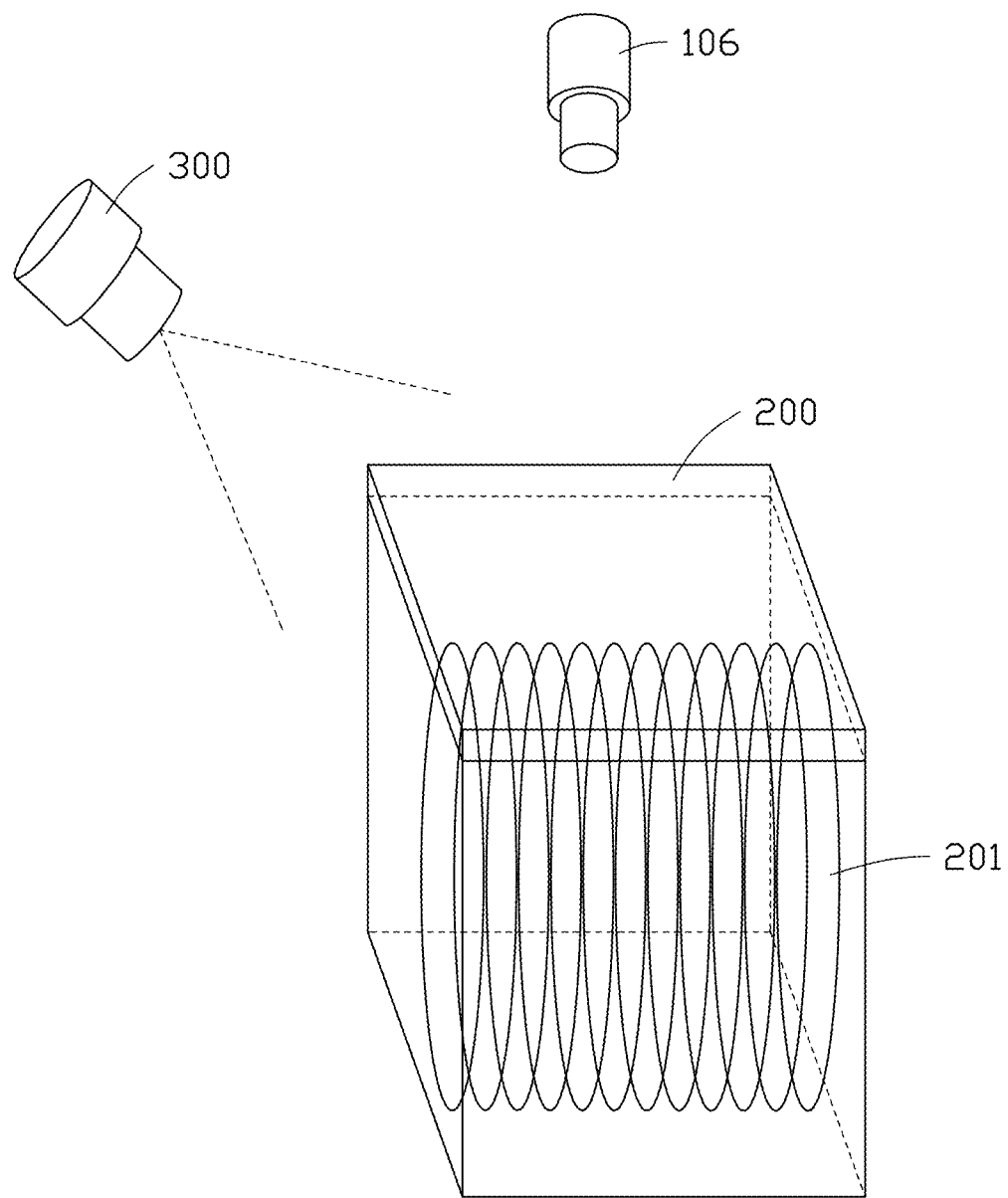
FIG. 3 is a diagram illustrating an embodiment of a camera and the packaging.

In one embodiment, the sealed case 200 is located under a specified light source 300 (as shown in FIG. 3). The specified light source 300 is used for highlighting or otherwise improving edge features of the target objects 201 in the sealed case 200. The specified light source 300 can be an ultraviolet lamp or a fluorescent lamp, not being limited. The locations of the camera 106 and the specified light source 300 are related to a shape and a transparency of the sealed case 200. For example, when an upper part of the sealed case 200 is transparent, and the locations of the target object 201 can be confirmed from a side (laterally) of the sealed case 200, the specified source light 300 is disposed upon the sealed case 200, and the camera 106 is disposed on an upper left corner of the sealed case 200.

An image processing module 30 divides the detection image into the specified number of the detection regions in a predetermined manner.

An extracting module 40 extracts images of the first detection region A in the detection image as local images, and inputs the local images into the detection model.

A statistics module 50 obtains number information and location information of the target objects 201 in the sealed case 200 based on a statistic result outputted by the detection model.

In one embodiment, the number information includes a total number of the individual target objects 201 in the sealed case 200, and a total number of the target objects 201 in each local image. The location information includes number of the detection region and number of positions of the target objects 201 in that detection region.

Based on the above object location apparatus 100, the number of the training sets of the detection model is reduced. By dividing the image of the sealed case 200, the processing speed of the detection model is improved. The sealed case 200 is disposed under the specified light source 300, and edge features of the target objects 201 are made more conspicuous. Therefore, an accuracy of the detection model is optimized.

Figure 5:
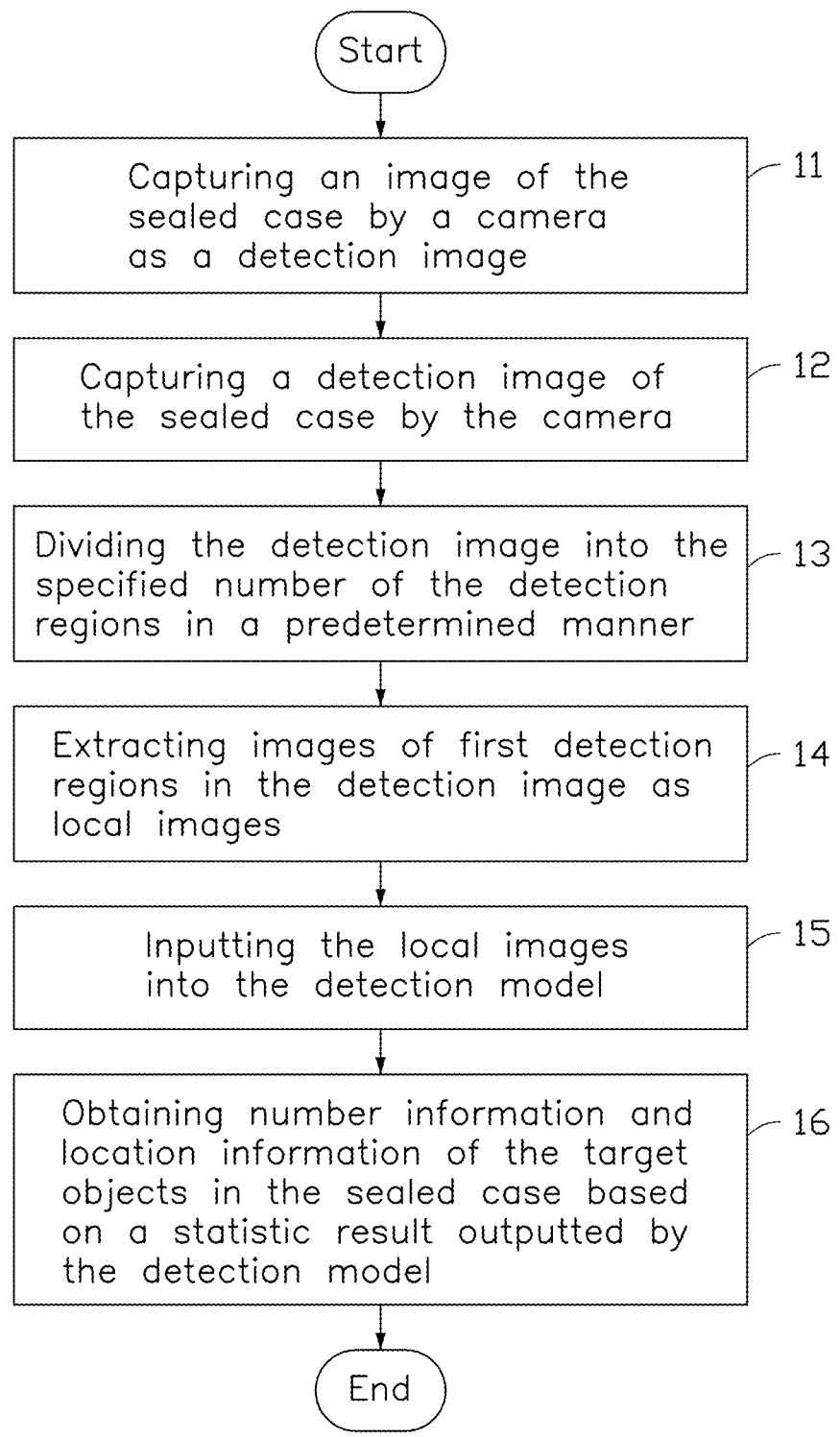
FIG. 5 is a flowchart illustrating an embodiment of a method for identifying target objects.

FIG. 5 shows a flowchart of a method for the above. In at least one embodiment, a method for identifying target objects 201 in the sealed case 200 is used in the object identification system 1 of the object identification apparatus 100. The object identification apparatus 100 can include a part or more hardware or software in FIGS. 1 and 2, or the elements in different location. The method is used for capturing an image of target objects 201 received in a sealed case 200, inputting the captured image into a detection model, and identifying number and respective locations of the target objects 201 in the sealed case 200, based on output of the detection model. In one embodiment, the sealed case 200 is a wafer shipping box. The sealed case 200 can be made of transparent material or semi-transparent material. The target objects 201 are wafers.

The method may comprise at least the following steps, which may be followed in a different order:

In block 11, the modeling module 10 models a detection model by using standard data as a training set.

In one embodiment, the standard data includes a plurality of sample images of the sealed case 200 with the target objects 201, each sample image corresponds to different numbers and locations of individual target objects 201. The standard data further includes a plurality of supplementary images. The modeling module 10 further divides an image region into a specified number of first detection regions A (as shown in FIG. 4), selects one of the first detection regions A as a first standard region, and extracts the images of the first standard region with different numbers and locations of the target objects 201 as the sample images. The modeling module 10 further selects one second detection region B as a second standard region and extracts the images of the second standard region with different numbers and locations of the target objects 201 as the supplementary images. The training set of the detection model includes the sample images and the supplementary images. Each supplementary image is used for identifying a target object 201 between two adjacent first standard regions A. The image region is equal to a region of an image captured by the camera 106. A number of the supplementary images is less than or equal to the number of the sample images. A capacity of the sealed case 200, which is a maximum number of the received target objects 201, is M, and a specified number is N, and N is less than M. The number of the sample images is $2^{(M/N)}$. When M is 25, the number of the sample images is $2^5=32$, and the number of the supplementary images can be 3. The sample images and the supplementary images clearly identify locations of individual target objects 201. The specified number can be set according to user's requirements. The detection model is a deep learning network model.

Figure 6:
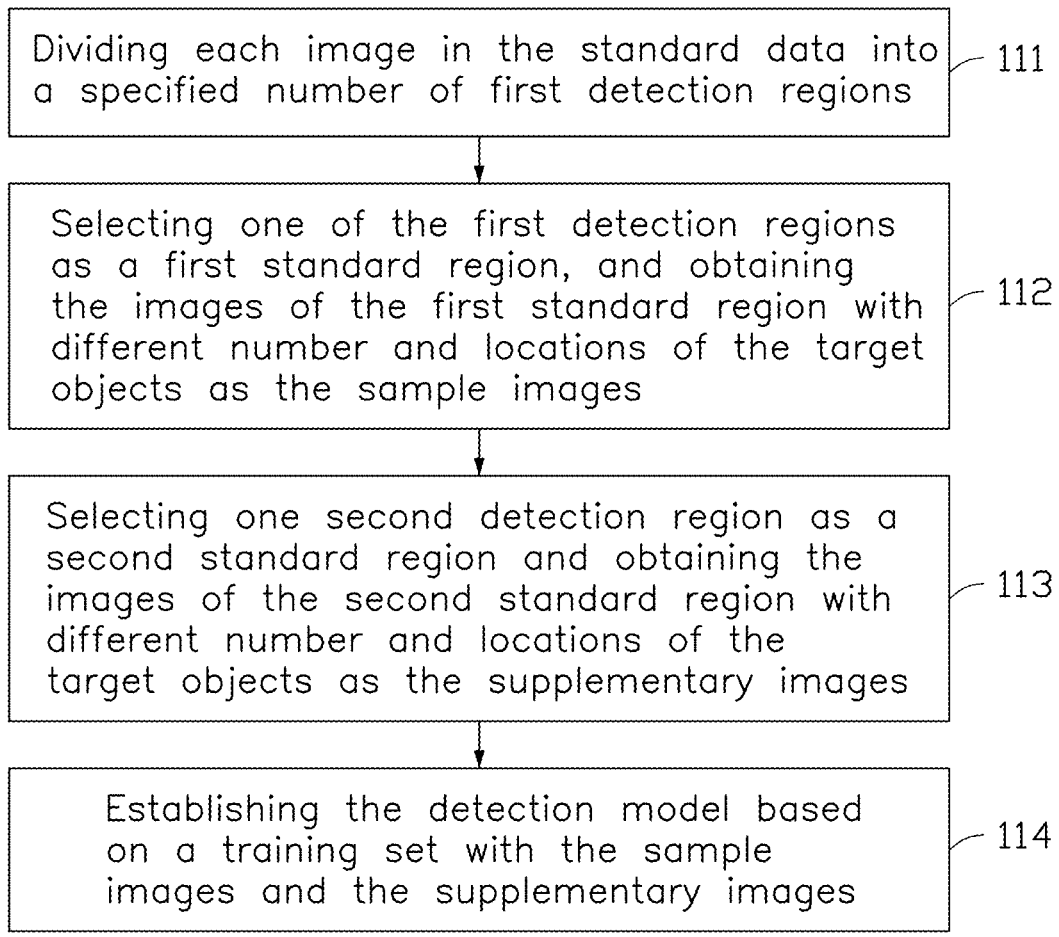
FIG. 6 is a detailed flowchart illustrating an embodiment of block 11 in the method of FIG. 5.

FIG. 6 shows a detailed flowchart of the block 11.

In block 111, the modeling module 10 divides each image in the standard data into a specified number of first detection regions A.

In block 112, the modeling module 10 selects one of the first detection regions A as a first standard region, and obtains images of the first standard region with different numbers and locations of the target objects 201 as the sample images.

In block 113, the modeling module 10 selects one second detection region B as a second standard region and obtains the images of the second standard region with different numbers and locations of the target objects 201 as the supplementary images.

In block 114, the modeling module 10 establishes the detection model based on a training set with the sample images and the supplementary images.

In one embodiment, each supplementary image is used for identifying a target object 201 between two adjacent first standard regions A. The image region is equal to a region of an image captured by the camera 106.

In block 12, the image capturing module 20 captures a detection image of the sealed case 200 by the camera 106.

In one embodiment, the sealed case 200 is under a specified light source 300 (as shown in FIG. 3). The specified light source 300 is used for improving edge features of the target object 201 in the sealed case 200. The specified light source 300 can be an ultraviolet lamp or a fluorescent lamp, not being limited. The locations of the camera 106 and the specified light source 300 are related to a shape and a transparency of the sealed case 200. For example, when an upper part of the sealed case 200 is transparent, and the locations of the target object 201 can be confirmed from a lateral viewpoint, the specified source light 300 is disposed upon the sealed case 200, and the camera 106 is disposed on a upper left corner of the sealed case 200.

In block 13, the image processing module 30 divides the detection image into the specified number of the detection regions in a predetermined manner.

In block 14, the extracting module 40 extracts images of the first detection region A in the detection image as local images.

In block 15, the extracting module 40 inputs the local images into the detection model.

In block 16, the statistics module 50 obtains number information and location information of the target objects 201 in the sealed case 200 based on a statistic result outputted by the detection model.

In one embodiment, the number information includes a total number of the target objects 201 in the sealed case 200, and a total number of the target objects 201 in each local image. The location information includes number of the detection region and number of positions of the target objects 201 in that detection region.

The method reduces the number of the training sets of the detection model. By dividing the image of the sealed case 200, the processing speed of the detection model is improved. The sealed case 200 being disposed under the specified light source 300 enhances edge features of the target objects 201. Therefore, an accuracy of the detection model is optimized.

The present disclosure also provides a storage medium. The storage medium can be a computer readable storage medium. The computer instructions are stored in the storage 102 and are implemented by the processor 106 to achieve a method for identifying target objects as recited in blocks 11-16 of FIG. 5.

While various and preferred embodiments have been described the disclosure is not limited thereto. On the contrary, various modifications and similar arrangements (as would be apparent to those skilled in the art) are also intended to be covered. Therefore, the scope of the appended claims should be accorded the broadest interpretation so as to encompass all such modifications and similar arrangements.

What is claimed is:

1. A method for identifying target objects in a sealed case, the method comprising:
   modeling a detection model by using standard data as a training set; the standard data comprises sample images of the sealed case with different number and locations of the target objects; a capacity of the sealed case is M, and a number of the sample image is less than $2^M$;
   capturing an image of the sealed case by a camera as a detection image;
   dividing the detection image into a specified number of the detection regions in a predetermined manner;
   extracting images of first detection regions in the detection image as local images;
   inputting the local images into the detection model; and
   obtaining number information and location information of the target objects in the sealed case based on a statistic result outputted by the detection model.

2. The method of claim 1, wherein the specified number is N, which is less than M; a number of the sample image is $2^{(M/N)}$.

3. The method of claim 2, wherein the method of modeling a detection model by using standard data as a training set comprising:
   dividing each image in the standard data into a specified number of first detection regions;
   selecting one of the first detection regions as a first standard region, and obtaining the images of the first standard region with different number and locations of the target objects as the sample images;
   selecting one second detection region as a second standard region and obtaining the images of the second standard region with different number and locations of the target objects as the supplementary images; and
   establishing the detection model based on a training set with the sample images and the supplementary images.

4. The method of claim 3, wherein the second standard region is overlapped with two adjacent first standard regions; a number of the supplementary images is less than the number of the sample images.

5. The method of claim 3, wherein a size of the second standard region is equal to a size of the first standard region.

6. The method of claim 1, wherein the detection model is a deep learning network model.

7. The method of claim 5, wherein the sealed case is disposed under a specified light source; edge features of the target object are enhanced by the specified light source.

8. The method of claim 5, wherein the camera is angled with the sealed case; the angle is related to a transparency and a shape of the sealed case.

9. An object identification apparatus for identifying target objects in a sealed case; the object identification apparatus comprises a processor and a storage; the processor executes program codes stored in the storage to implement the following steps:
   a modeling module, configured to model a detection model by using standard data as a training set; the standard data comprises sample images of the sealed case with different number and locations of the target objects; a capacity of the sealed case is M, and a number of the sample image is less than $2^M$;
   an image capturing module, configured to capture an image of the sealed case by a camera as a detection image;
   an image processing module, configured to divide the detection image into a specified number of the detection regions in a predetermined manner;
   an extracting module, configured to extract images of first detection regions in the detection image as local images, and input the local images into the detection model; and
   a statistics module, configured to obtain number information and location information of the target objects in the sealed case based on a statistic result outputted by the detection model.

10. The object identification apparatus of claim 9, wherein the specified number is N, which is less than M; a number of the sample image is $2^{(M/N)}$.

11. The object identification apparatus of claim 9, wherein the modeling module further divides each image in the standard data into a specified number of the first detection regions, selects one of the first detection regions as a first standard region, and obtains the images of the first standard region with different number and locations of the target objects as the sample images; the modeling module further selects one second detection region as a second standard region and obtaining the images of the second standard region with different number and locations of the target objects as the supplementary images; the detection model comprises a training set with the sample images and the supplementary images.

12. The object identification apparatus of claim 11, wherein the second standard region is overlapped with two adjacent first standard regions; a number of the supplementary images is less than the number of the sample images; a size of the second standard region is equal to a size of the first standard region.

13. The object identification apparatus of claim 9, wherein the detection model is a deep learning network model.

14. The object identification apparatus of claim 9, wherein the sealed case is disposed under a specified light source; edge features of the target object are enhanced by the specified light source; the camera is angled with the sealed case; the angle is related to a transparency and a shape of the sealed case.

15. A storage medium comprises a storage medium and a processor; the storage medium stores instructions being executed by the processor to implement following steps:
 modeling a detection model by using standard data as a training set; the standard data comprises sample images of the sealed case with different number and locations of the target objects; a capacity of the sealed case is M, and a number of the sample image is less than $2^M$;
 capturing an image of the sealed case by a camera as a detection image;
 dividing the detection image into a specified number of the detection regions in a predetermined manner;
 extracting images of first detection regions in the detection image as local images;
 inputting the local images into the detection model; and
 obtaining number information and location information of the target objects in the sealed case based on a statistic result outputted by the detection model.

16. The storage medium of claim 15, wherein the specified number is N, which is less than M; a number of the sample image is $2^{(M/N)}$.

17. The storage medium of claim 15, wherein the step of modeling a detection model by using standard data as a training set comprising:
 dividing each image in the standard data into a specified number of the first detection regions;
 selecting one of the first detection regions as a first standard region, and obtaining the images of the first standard region with different number and locations of the target objects as the sample images;
 selecting one second detection region as a second standard region and obtaining the images of the second standard region with different number and locations of the target objects as the supplementary images; and
 establishing the detection model based on a training set with the sample images and the supplementary images.

18. The storage medium of claim 17, wherein the second standard region is overlapped with two adjacent first standard regions; a number of the supplementary images is less than the number of the sample images; a size of the second standard region is equal to a size of the first standard region.

19. The storage medium of claim 15, wherein the detection model is a deep learning network model.

20. The storage medium of claim 15, wherein the sealed case is disposed under a specified light source; edge features of the target object are enhanced by the specified light source; the camera is angled with the sealed case; the angle is related to a transparency and a shape of the sealed case.

* * * * *